United States Patent [19]

Tippmann

[11] Patent Number: 5,318,792

[45] Date of Patent: Jun. 7, 1994

[54] SUBATMOSPHERIC PRESSURE COOK-AND-HOLD STEAMING METHOD

[76] Inventor: Eugene R. Tippmann, 114 Nut Tree Ct., Lexington, S.C. 29072

[21] Appl. No.: 79,594

[22] Filed: Jun. 22, 1993

Related U.S. Application Data

[62] Division of Ser. No. 852,785, Mar. 17, 1992, Pat. No. 5,235,903.

[51] Int. Cl.$^5$ .............................................. A23L 1/00
[52] U.S. Cl. .................................. 426/510; 426/407; 426/511; 426/523
[58] Field of Search ............... 426/510, 511, 520, 523, 426/407; 99/331, 332, 446, 468, 472; 126/20, 369

[56] References Cited

U.S. PATENT DOCUMENTS

| | | | |
|---|---|---|---|
| 3,071,473 | 1/1963 | Churley | 426/510 |
| 3,223,021 | 12/1965 | Osswald | 99/470 |
| 3,769,902 | 11/1973 | Hurwitz | 99/472 |
| 3,800,778 | 4/1974 | Lohr et al. | 99/468 |
| 4,011,805 | 3/1977 | Vegh et al. | 99/467 |
| 4,173,215 | 11/1979 | Bureau et al. | 126/369 |
| 4,340,613 | 7/1982 | Moore | 426/510 |
| 4,455,924 | 6/1984 | Wenzel | 99/333 |
| 4,623,780 | 11/1986 | Shelton | 219/401 |
| 4,641,630 | 2/1987 | Meister | 126/20 |
| 4,700,685 | 10/1987 | Miller | 99/330 |
| 4,884,553 | 12/1989 | Schwarzbacker | 219/401 |

*Primary Examiner*—George Yeung
*Attorney, Agent, or Firm*—Sixbey, Friedman, Leedom & Ferguson

[57] ABSTRACT

A cooking and holding food preparation unit is disclosed having one or more food receiving compartments each including a door and a gasket for hermetically sealing the compartment when the door is closed. An open-topped tray for holding water is located near the bottom of the compartment and has therebeneath electrical heating strips for heating water in the tray. A thermostat is coupled to the tray and to the heating strips for maintaining the temperature of the tray at an operator selected temperature typically well below the temperature at which water boils under standard conditions. A vacuum pump selectively reduces the air pressure within the compartment while a vacuum release valve selectively couples the compartment to the exterior atmosphere. There is a timer for measuring elapsed time after cooking is begun which functions to open the vacuum release valve upon the expiration of an operator determined time interval. Thus, ambient pressure surrounding the food product may be reduced and low temperature steam allowed to surround the food product for a predetermined period of time to cook the food product. When cooking is completed, the ambient pressure may be restored to atmospheric pressure and the food product held at a preferred temperature without further cooking.

10 Claims, 5 Drawing Sheets

SUBATMOSPHERIC PRESSURE COOK-AND-HOLD STEAMING METHOD

This is a divisional application of Ser. No. 07/852,785, filed Mar. 17, 1992 now U.S. Pat. No. 5,235,903.

SUMMARY OF THE INVENTION

The present invention relates generally to cooking ovens and more particularly to such an oven which cooks utilizing steam as the heating medium. Preferably, the steam is at a reduced pressure during cooking and the oven is adapted to hold the cooked product at a preferred temperature in a moist air medium subsequent to cooking.

There are a wide variety of known cooking techniques and there has been, within each, a great deal of experimentation with the several variables associated with such cooking techniques. For example, the use of steam as a heat transfer medium is well known. Such steam cooking devices may employ the steam at atmospheric pressure as in U.S. Pat. No. 4,011,805 with convection heat transfer. Steam as the heat transfer medium at substantially atmospheric pressure with forced convection heat transfer is also known in U.S. Pat. No. 4,173,215. In this last patented arrangement, water is introduced into the bottom of a steam chamber and a heat source outside that chamber heats that water to produce steam. The chamber is vented so as to maintain the pressure within the cooking vessel at substantially atmospheric pressure. Such steam cooking devices may employ the steam at an elevated pressure as in the common "pressure cooker." U.S. Pat. No. 3,800,778 discloses a steam cooker with a valve and pump arrangement so that the pressure within the cooking vessel can be maintained either above or below atmospheric pressure. The stated reason for cooking below atmospheric pressure is to cook at a reduced temperature so that delicate foods will not be overcooked and their vitamins lost. U.S. Pat. No. 8,223,021 employs this same general concept in a coffee roasting oven which operates below atmospheric pressure for a period of time and then has its internal pressure increased. The coffee in this roasting oven is cooled after roasting and before the pressure is released. Finally, the concept of a food holding cabinet is old and disclosed, for example, in U.S. Pat. No. 4,623,780. This patent points out that it is difficult to maintain precooked food at a preferred serving temperature while maintaining its moisture content. The patent suggests food storage at a temperature below its cooking temperature and in a steam atmosphere to maintain crust crispness, for example, with fried chicken, while minimizing moisture loss.

There has been a significant amount of research into eating habits as they relate to health. For example, in the article PREVENTION OF FORMATION OF IMPORTANT MUTAGENS/CARCINOGENS IN THE HUMAN FOOD CHAIN by Weisburger and Jones, it is pointed out that during cooking (typically frying or broiling) leading to the browning of meat or fish, mutagens or carcinogens are frequently generated. The article suggests the desirability of finding ways to lower or prevent the formation of these undesirable products during cooking. One scheme for lowering these undesirable products is to reduce the surface temperature during cooking. Another is by additives to the meat or fish prior to cooking.

From the above article, it appears that the undesirable mutagens or carcinogens will be generated on the food surface during cooking, for example, of hamburger on a conventional hot grill and that these undesirable products will be scraped off the grill with the meat and placed in the consumer's sandwich.

The current method of cooking hamburger, for example, requires a lot of fat for three reasons. The fat acts as a release agent preventing the meat from sticking to the griddle. It also acts as a heat transfer medium. Finally the fat provides the "juiciness" in the finished sandwich. The undesirability of the conventional "fast food" approach to cooking beef for sandwiches on a hot grill should now be apparent.

Lower cooking temperatures not only reduce or eliminate the formation of the above noted mutagens or carcinogens, but also provides a more palatable product. Exposing meat to high temperatures causes the fibers in the meat to shrink purging the meat of its natural juices. Such high temperature cooking also cooks the outer surface to its "done" state prior to the interior reaching that "done" condition. Thus, the outer portions are frequently comparatively over-cooked, dry and tough. Reduced cooking temperatures ensure that the food product will not be over-cooked regardless of the time the food product is subjected to that reduced temperature and that the center as well as the surface will be cooked to perfection.

It is a well known phenomenon that it seems to take forever to hard boil an egg at high elevations, say, for example, high in the mountains, where the air pressure is significantly lower than it is at sea level. The reason is that the water in which the egg is immersed boils at a much lower temperature under the reduced pressure conditions and the egg never gets as hot as it will under similar circumstances at sea level. The present invention capitalizes on this phenomenon by reducing the pressure within the cooking vessel during cooking and then changing the heat transfer medium to air to hold the now cooked food ready to be served. Unlike the egg, the food product is heated by the steam within the vessel in the present invention, not by the water being evaporated to produce that steam. The food is held after cooking in a warm saturated (100% relative humidity) atmosphere and may be so held for several hours without deleterious effect on the food.

Among the several objects of the present invention may be noted the provision of a cooking technique which provides a moist food product, such as meat, without the fat normally present in such moist food products; the provision of an oven capable of cooking and thereafter holding the cooked product at a preferred temperature without dehydrating that cooked product and the reduction or avoidance of the carcinogens and mutagens frequently associated with the cooking of meat on a grill. These as well as other objects and advantageous features of the present invention will be in part apparent and in part pointed out hereinafter.

In general, a method of preparing a food product includes the reduction of the ambient pressure surrounding the food product while allowing steam to surround the food product for a predetermined period of time to cook the food product. thereafter, air is allowed to enter the cavity or chamber in which the food product is located and the food product is maintained at a preferred holding temperature without further cooking. With this process, the effective heat transfer rate to the food product is substantially greater during the time period of reduced pressure and is significantly reduced when the air enters the cavity. Reentry of air is typically associated with a restoration to atmospheric pressure. Preferably, to generate the steam, water is boiled in the range of one-hundred sixty to one-hundred seventy degrees fahrenheit in the reduced ambient pressure.

Also in general and in one form of the invention, a cooking and holding food preparation unit or oven has a food receiving compartment and a door with an interposed gasket for hermetically sealing the compartment when the door is closed. A liquid receiving open-topped tray is located near the bottom of the compartment. The compartment itself may function as the tray. The liquid typically simple tap water, in the tray is heated by electrical resistance strip heating elements beneath the compartment which are under the control of a thermostat coupled to the tray and to the heating elements so as to maintain the temperature of the tray at an operator selected temperature. The air pressure within the compartment is maintained at a subatmospheric level by a vacuum pump while food is being cooked. A vacuum release valve selectively couples the compartment to the exterior atmosphere and there may be a timer for measuring elapsed time after cooking is begun which opens the vacuum release valve upon the expiration of an operator determined cooking time interval. While the liquid may be simple tap water aromatic materials may be added to give the food a particular flavor. A "smoked" flavor could, for example, be easily provided in this way.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
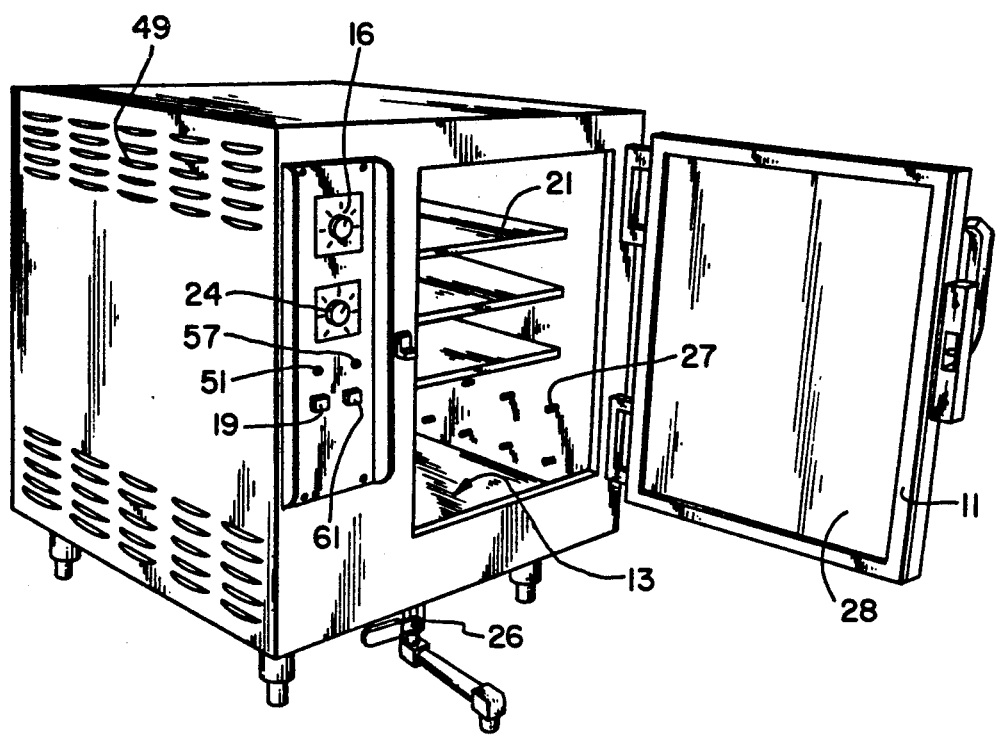
FIG. 1 is a perspective view of a single compartment steam cooking and holding oven illustrating my invention in one form.
Figure 2:
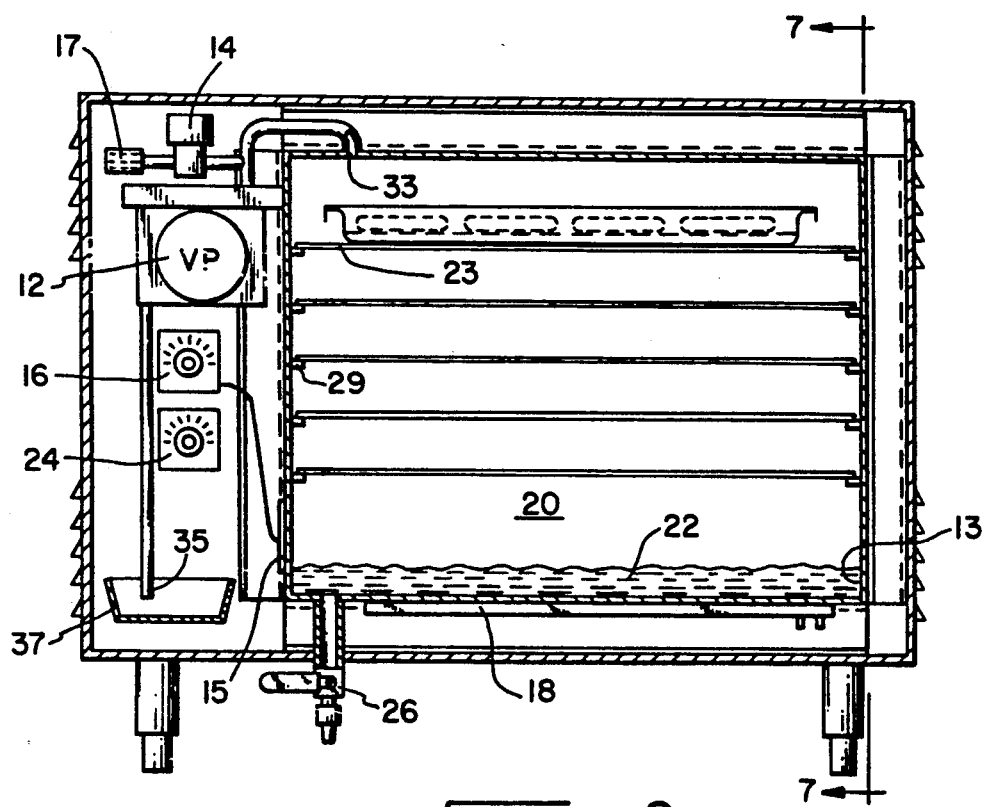
FIG. 2 is a front view of the oven of FIG. 1 with the front panel thereof removed.
Figure 7:
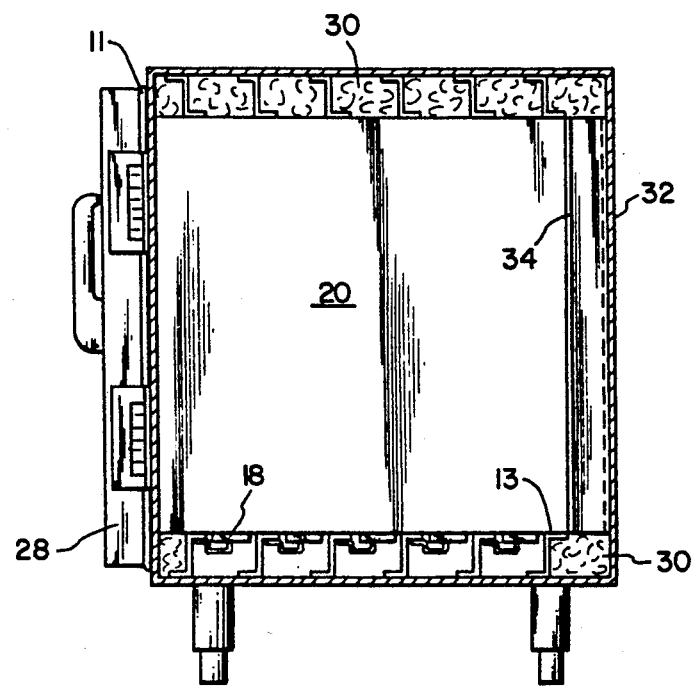
FIG. 7 is a view in cross-section along line 7—7 of FIG. 2, but with the shelves removed.

A cooking and holding food preparation unit or oven is shown in FIGS. 1, 2 and 7 and includes a food receiving compartment 20. The compartment includes a door 28 and a gasket 11 for hermetically sealing the compartment when the door is closed. There is a liquid receiving open-topped tray in the form of the sealed bottom compartment region is near the bottom of the compartment. This tray holds about two gallons of water 20. Water 20 is heated by strip resistance heating elements 18. The temperature of the compartment is sensed by probe 18 of thermostat 16 the setting of which controls energization of the heating elements 18 thereby maintaining the temperature of the compartment at an operator selected temperature. A vacuum pump 12 is provided for selectively removing air and reducing the pressure within the compartment 20 and a vacuum release valve 14 selectively couples the compartment 20 to the exterior atmosphere at outlet 17. A timer 24 measures elapsed time after cooking is begun and functions to open the vacuum release valve 14 upon the expiration of an operator designated time interval.

Figure 3:
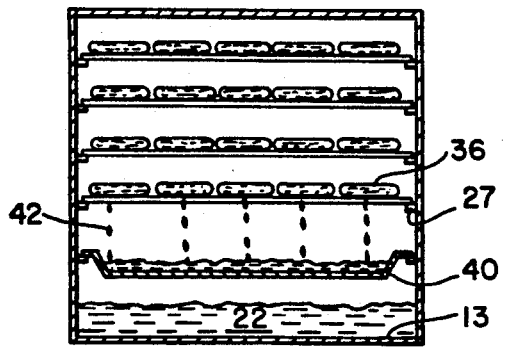
FIG. 3 is a front view in cross-section of the oven cavity portion thereof illustrating one cooking mode.

There is a start control 19 which, when depressed, initiates operation of both the thermostatic control of the heating elements 18 and the timer 24. Once started, the thermostatic control and timer operate independently of one another and, typically, operation of the heating elements 18 continues long after the opening of the vacuum release valve 14. Tray 13 may be filled and emptied daily and a manually operable drain valve 26 has been provided near the lowermost portion of the tray to facilitate nightly draining thereof. There are a plurality of food receiving racks such as 21, 23 and 25 (FIGS. 1, 2, 8 and 9 respectively) supported in stacked relationship within the compartment 20 by sidewall pins such as 27, 29 and 31. There is also an optional grease catching pan 40 in FIG. 3 and 38 in FIG. 9 which is interposed between the lowermost of the racks and the water evaporation tray 13. The pump 12 has an inlet 33 located near the top of the compartment 20 and an outlet 35 which terminates immediately above a moisture collection pan 37. Little moisture is collected by this pan and, like the tray in an automatic defrost refrigerator, evaporation is adequate to keep it from overflowing. A heating element 39 (FIG. 10) may be provided beneath tray 87 to aid evaporation if desired.

Figure 10:
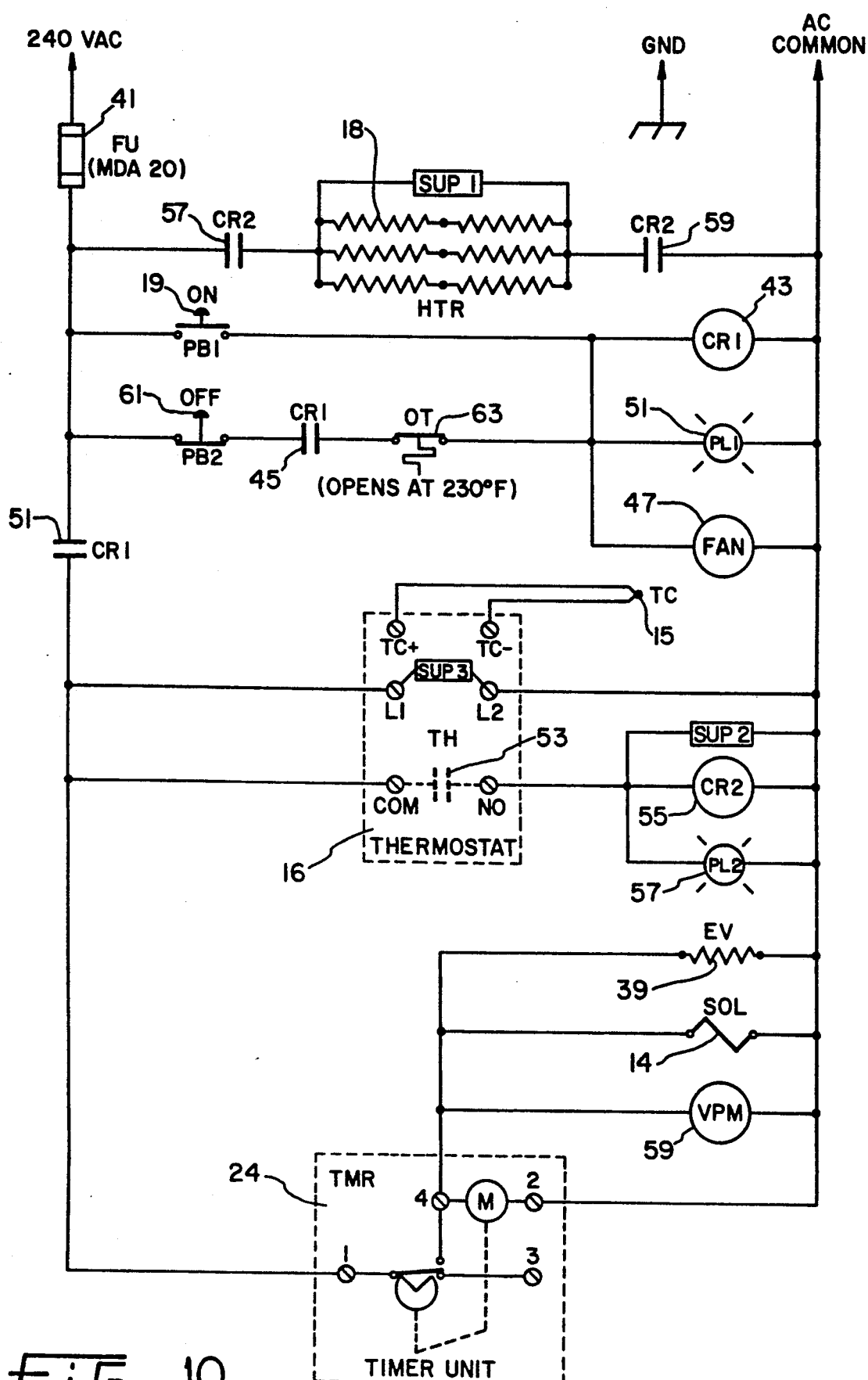
FIG. 10 is an electrical schematic diagram of a control circuit suitable for the practice of the present invention.

Many of the components of FIG. 10 have already been discussed. A main fuse 41 is placed in the hot line. When the operator depresses the ON button 19, control relay number one is latched with its coil continuously energized by way of its now closed contacts 45. A fan 47 which circulates cooling air through the louvers such as 49 and between the oven walls is similarly continuously energized as is the ON indicator light 51. A second set of normally open contacts 51 close when coil 43 is energized supplying electrical energy to the thermostat 16. So long as the thermostat 16 contacts 53 are closed indicating a below desired temperature condition, coil 55 of a second control relay is enabled. This second control relay has two sets of normally open contacts 57 and 59 which close to energize the heating elements such as 18. When coil 55 is on, a heaters ON lamp 57 is also energized. When timer 24 is active, solenoid coil 14 is enabled and the vent closed off. At the same time the motor 59 which drives the vacuum pump 12 is enabled to reduce the interior vessel pressure. When the timer times out, the pump motor 59 and solenoid 14 are disabled opening the vent 17 and returning interior pressure to atmospheric. Heaters 18 remain ON. To shut off the oven, OFF button 61 is momentarily depressed disabling coil 48 and causing contacts 51 to reopen. An over temperature sensor 63 may effect this same turn off if the oven temperature exceeds, say, 230 degrees fahrenheit.

In one preferred embodiment, a double wall construction was utilized with about two inches of insulation 30 between the cooking compartment 20 and certain ones of the exterior walls. Typically, the door 28 and top are insulated. Other exterior walls such as 82 were spaced from the interior walls such as 34 and air allowed to circulate between the walls to maintain the outer walls at a safe temperature. Typically, 14 gauge stainless steel interior walls such as 34 and 20 gauge stainless steel exterior walls were utilized except for the door 28 which utilized 20 gauge stainless steel for both its inner and outer wall panels.

The cooking and holding food preparation unit as described has a single compartment, but two compartment models are also contemplated with each compartment substantially as described and operable independently of the other. The cooking and holding food preparation unit is particularly suited to use in schools, hospitals and similar institutional environments as well as restaurants and other commercial operations.

The method of operation of the invention should now be clear. During the cooking cycle, the vacuum pump 12 is on, the solenoid valve 14 is closed and the thermostat 16 is controlling the strip heaters 18. The vacuum pump removes air from the compartment 20 reducing the pressure therein and causing the water 22 to boil at a temperature well below the normal 212 degree fahrenheit boiling point. The thermostat 16 setting determines the temperature of the water 22 and steam within the compartment 20. Steam condenses on the surface of food products (or their containers) within the compartment adding heat thereto. This cook cycle continues until the timer 24 times out and converts the oven to its hold mode of operation.

During the hold cycle or mode, the vacuum pump 12 is off, the solenoid valve 14 is open and the thermostat 16 continues to control the heaters 18. All the heat comes through the water 22 causing the relative humidity within the compartment 20 to be at 100%. Because of this 100% relative humidity, no moisture evaporates from the food product during this hold mode.

Figure 4:
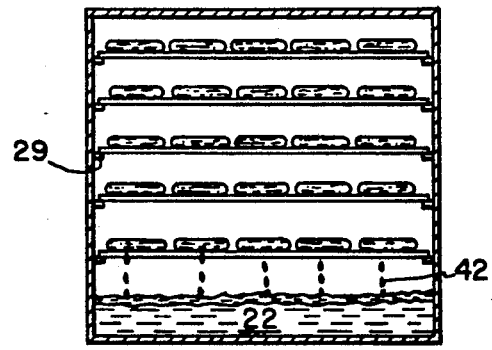
FIG. 4 is a front view in cross-section of the oven cavity portion thereof illustrating another cooking mode.
Figure 5:
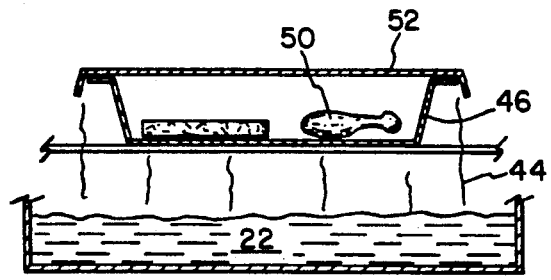
FIG. 5 is a front view in cross-section of the lower part of the oven cavity portion thereof illustrating a "dry" cooking mode.
Figure 6:
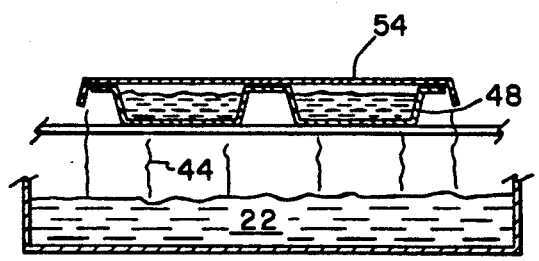
FIG. 6 is a front view in cross-section of the lower part of the oven cavity portion thereof illustrating yet another cooking mode.
Figure 8:
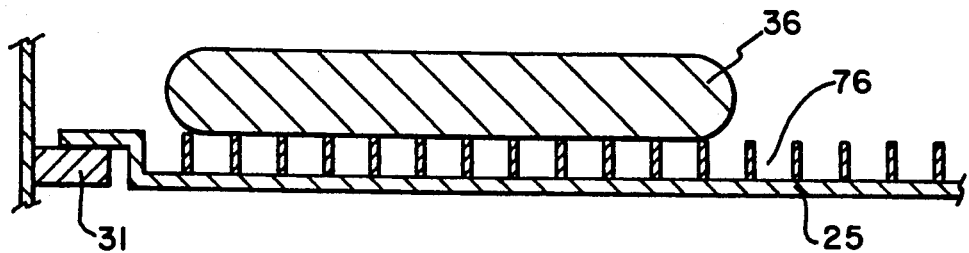
FIG. 8 is a view in cross-section along line 8—8 of FIG. 9 and showing a food product supported on a portion of a rack or shelf.
Figure 9:
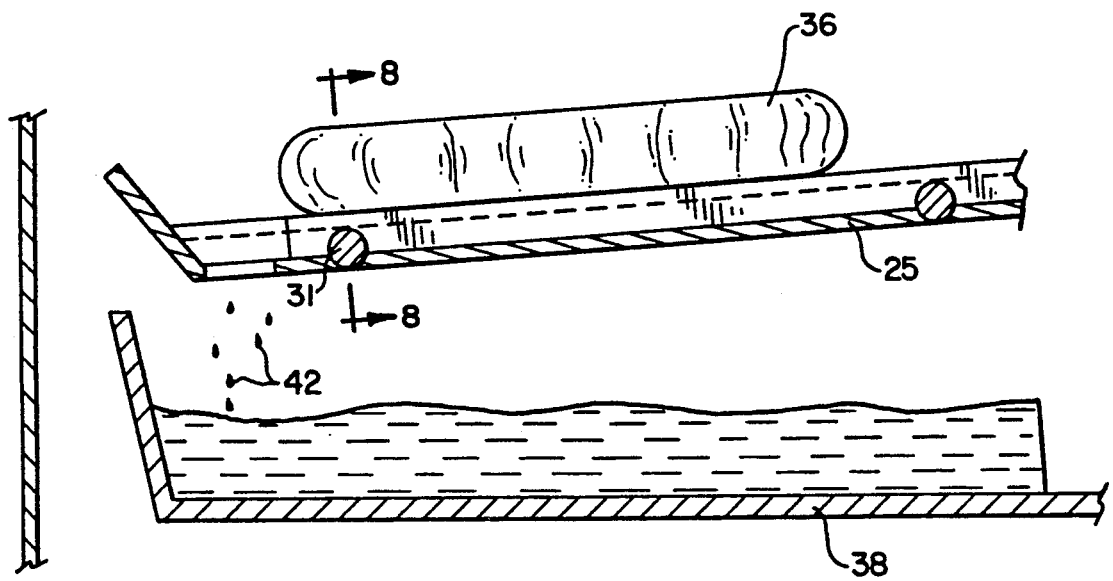
FIG. 9 is a view in cross-section of the rack and food product of FIG. 8 superposed over a grease collecting pan.

FIGS. 8, 4, 8 and 9 generally illustrate the "lean" cooking of meat with fat dripping away therefrom as at 42 while FIGS. 5 and 6 illustrate that "crispy" food products may be cooked in the unit without the direct application of the steam 44 thereto by enclosing them in a cowered non-hermetic vessel 46 so that heat transfer is from the steam to the vessel and then from the vessel by a combination of conduction and convection to the food product so that the food product is protected from becoming too moist from direct exposure to the steam.

It should be noted that lids 52 and 54 in FIGS. 5 and 6 extend beyond and below the edges of their respective vessels. Since steam is heavier than air, an air lock or trap is formed by the air within the underside of the lid effectively preventing steam from entering and condensing on the food products.

As a specific illustration of the operation of the oven and of the unique cooking method herein, a hamburger 86 may be cooked in about 20 minutes in one-hundred sixty five degree fahrenheit steam. As the steam adds heat to the hamburger, the fat melts and drains into the catch pan 38 (FIG. 9) or 40 (FIG. 8). The juice that is purged from the meat which carries creatinine, drains into the catch pan and the fat and juice are never consumed. In some cases, the juice may simply be allowed to drain back into the water supply 22 as shown in FIG. 4. In either case, no mutagens or carcinogens are formed on the meat because the juice carrying the creatinine runs off and because the meat is never exposed to any high temperatures. The one-hundred sixty five degree temperature is not sufficiently high to form the earlier discussed mutagens and carcinogens. The hamburger may be subsequently held ready to be served for up to several hours if desired. This sequence of events is illustrated generally in FIG. 11.

Figure 11:
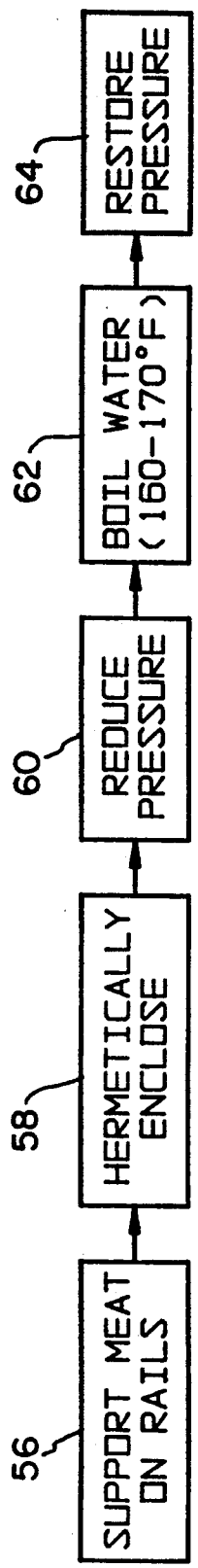
FIG. 11 is a flow chart illustrating one unique cooking technique utilizing the oven of FIG. 1.

In FIG. 11, a food product such as a hamburger (actually beef) patty is cooked in a way to significantly reduce the usual heat induced shrinkage by initially supporting 56 that beef patty on a plurality of relatively thin rails such as the extruded aluminum grill or rack 25 of FIG. 9 so that there are the spaces such as 76 between the rails through which the fat may drain. The thus supported patty is hermetically enclosed 58 within the oven cavity and the pressure therein reduced as indicated at 60. Steam generated at 62 by water boiling within the hermetic enclosure at, for example, 160 to 170 degrees fahrenheit surrounds the patty transferring heat thereto. At the desired time, the pressure is reduced at 64 and the cooked patty held at a preferred temperature and without significant moisture loss awaiting consumption.

Figure 12:
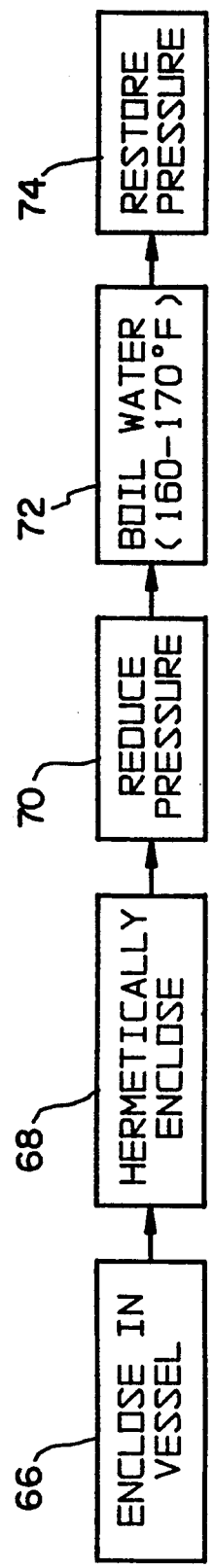
FIG. 12 is a flow chart illustrating another unique cooking technique utilizing the oven of FIG. 1.

As a second specific illustration, consider FIGS. 5 and 6 in conjunction with the cooking process illustrated in FIG. 12. A food product such as fried chicken 50 having a surface which should be kept "crispy" is enclosed in a vessel 46 having a cover 52. The vessel or tray 46 along with its cover 52 form a non-hermetic vessel in which the food is enclosed as indicated by 66 in FIG. 12. Thereafter, the vessel is hermetically enclosed (68) and the ambient pressure surrounding the vessel is reduced as at 70. Steam generated at 72 is allowed to surround the covered vessel 46 or 52 for a predetermined period of time to cook the food product therein by the transfer of heat from the steam to the vessel (including to the lids 52 or 54) and then from the vessel to the food product by a combination of conduction and convection so that the food product is protected from becoming too moist from direct exposure to the steam. Finally, the ambient pressure surrounding the vessel is restored as at 74, to atmospheric pressure and the food product is maintained at a preferred temperature without further cooking and without the direct application of the steam to that food product. In FIGS. 5 and 6, the vessel covers 50 or 52 fit over the tray 46 or 48 forming an air lock to transmit the pressure changes within the oven cavity to the interior of the vessel while substantially excluding moisture condensate therefrom. In each case, the steam completely surrounds the vessel transferring heat to all sides thereof. The primary difference between the cooking technique of FIG. 5 and that of FIG. 6 is that the sidewalls of the container or vessel 48 are in direct heat conducting contact with the food product therein, e.g., a vegetable or pudding, while the food product in FIG. 5, e.g., a chicken leg 50, rests on the tray floor receiving heat by conduction therefrom, but is otherwise heated by convection within the vessel.

In summary, the invention has a number of advantages over known prior devices. Operation is simple, just set the time and temperature and when the time has elapsed, the oven automatically goes into its hold cycle. There is no need to transfer food from a cooking oven to a holding oven. The 100% relative humidity during the hold cycle assures that the food product will not dry out. There is no boiler. About two gallons of water are poured into the oven at the beginning of the day and at days end, valve 26 is opened and the water drained. While there may be a drain hookup if desired, the two gallons or less of water remaining in the oven at days end may simply be drained into a pan or bucket. With no drain hookup, the oven is easily moved and located in the most convenient position in a kitchen or cafeteria. Daily draining and refilling helps prevent the buildup of lime or other minerals within the oven. The reduced pressure within the cooking cavity prevents the door 28 from being opened during the cooking cycle. During the hold cycle, the door may be opened safely and without danger of scalding since only high humidity hot air is within the oven. Finally, the elimination of any drying of the food during the hold cycle enhances yield and reduces food costs.

From the foregoing, it is now apparent that a novel cooking and holding technique as well as a novel food preparation oven have been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A method of preparing a food product within a vessel comprising the steps of removing the air from the vessel and reducing the ambient pressure surrounding the food product, allowing steam to surround the food product for a predetermined period of time to cook the food product, and reintroducing air into the chamber to reduce the rate of heat transfer to the food product and maintaining the food product at a predetermined temperature without further cooking.

2. The method of claim 1 wherein the effective heat transfer rate to the food product is substantially greater during said predetermined period of time and is significantly reduced upon reintroduction of air into the vessel.

3. The method of claim 1 wherein the step of allowing steam to surround the food product includes boiling water in the range of one-hundred sixty to one-hundred seventy degrees fahrenheit in the reduced ambient pressure.

4. The method of claim 3 wherein the effective heat transfer rate to the food product is substantially greater during said predetermined period of time and is significantly reduced upon reintroduction of the air with the water temperature being maintained in the range of one-hundred sixty to one-hundred seventy degrees fahrenheit after restoration to atmospheric pressure.

5. The method of claim 1 wherein the step of allowing steam to surround the food product includes enclosing the food product with a non-hermetic vessel whereby heat transfer is from the steam to the vessel and then from the vessel by a combination of conduction and convection to the food product whereby the food product is protected from becoming too moist from direct exposure to the steam.

6. A method of preparing a food product comprising the steps of enclosing the food product within a non-hermetic vessel, reducing the ambient pressure surrounding the vessel, allowing steam to surround the vessel for a predetermined period of time to cook the food product by the transfer of heat from the steam to the vessel and then from the vessel to the food product by a combination of conduction and convection so that the food product is protected from becoming too moist from direct exposure to the steam.

7. The method of claim 6 including the additional step of restoring the ambient pressure surrounding the vessel to atmospheric pressure and maintaining the food product at a predetermined temperature without further cooking and without the direct application of the steam to that food product.

8. The method of claim 6 wherein the step of allowing steam to surround the vessel includes boiling water in the range of one-hundred sixty to one-hundred seventy degrees fahrenheit in the reduced ambient pressure.

9. The method of claim 6 wherein the vessel comprises a food tray and a tray cover, the cover fitting over the tray so as to transmit the pressure changes to within the vessel yet substantially excluding moisture condensate therefrom.

10. The method of claim 9 wherein the cover rests on the tray extending outwardly beyond the tray and downwardly to form an air lock to prevent steam from entering the vessel.

* * * * *